United States Patent Office

3,769,381
Patented Oct. 30, 1973

3,769,381
PRODUCTION OF MICROPOROUS SHEETS
Klaus Konig, Harro Traubel, and Artur Reischl, Leverkusen, and Bruno Zorn, Cologne-Flittard, Germany, assignors to Bayer Aktiengesellschaft, Leverkusen, Germany
No Drawing. Continuation of abandoned application Ser. No. 763,022, Sept. 26, 1968. This application July 26, 1971, Ser. No. 166,246
Claims priority, application Germany, Oct. 25, 1967, F 53,836
Int. Cl. B29d 27/00
U.S. Cl. 264—41                                6 Claims

ABSTRACT OF THE DISCLOSURE

Microporous sheets are prepared by reacting an NCO terminated prepolymer with a disecondary diamine in an inert substance that dissolves the reactants but causes only swelling of the product thereof and drying the dispersions thus formed to form microporous foils.

---

This application is a continuation of copending application Ser. No. 763,022, filed Sept. 26, 1968, now abandoned and relates to microporous sheets and to a method for producing same, more particularly, it relates to polyurethane or polyurea microporous sheets.

The preparation of polyurethane (urea) solutions in highly polar solvents, such as dimethylformamide is already known (U.S. Pat. 3,000,757). The production of microporous sheets from such solutions by coagulation with water is also known (DBP 1,110,607).

Furthermore, a process is known in which polyurethanes produced in bulk are dissolved in readily volatile solvents, nonsolvents are then added, and the solvent is then substantially removed by evaporation before the nonsolvent is removed (Belgian Pat. No. 652,899). Prior to these steps the polyurethanes are prepared by the melt casting process and are brought into solution after they have been broken down mechanically.

A disadvantage of the first mentioned process is that only expensive and toxic solvents can be used and these have to be recovered, which gives rise to difficulties; in the second process, it is a disadvantage that the polyurethanes cannot be produced directly in the solvent used.

It is therefore an object of this invention to provide an improved method of preparing microporous sheets. It is another object of this invention to provide a method of preparing microporous sheets by the polyisocyanate-polyaddition reaction. It is still another object of this invention to provide dispersions of polyurethane or polyurea polymers in inert substances which when deposited and dried form microporous sheets.

The foregoing objects and others which will become apparent from the following description are accomplished in accordance with this invention, generally speaking, by providing a process for the production of microporous sheets by reacting an NCO terminated prepolymer having a molecular weight of from about 1000 to about 5000 and prepared by reacting a difunctional compound having a molecular weight of from about 800 to about 4000 and containing active hydrogen atoms that are reactive with NCO groups with an excess of an organic diisocyanate and reacting this prepolymer with an amount of a disecondary diamine such that the NCO to NH ratio is from about 0.8 to about 1.2, this reaction occurring in an inert substance that is a solvent for the reactants, but only causes the product thereof to swell to the extent that a homogeneous film of a thickness of 0.2 to 0.5 millimeters prepared from the reactants when placed in the inert substance for 29 hours at 20° C. absorbs more than 100 percent by weight by swelling without dissolving and drying the dispersion thus formed to prepare a microporous sheet. The extinction of the polyurethane dispersions in the visible range amounts to 100 percent measured against the solvent in Zeiss Elko III colorimiter (with filter J 66.2).

It was expected that the synthesis of polyaddition products from NCO prepolymers and chain lengthening agents in solvents or solvent mixtures which are not capable of dissolving the end product would lead after some time to phase separation and to the formation of jelly-like precipitates of intermediate products.

It has surprisingly been found that this does not occur when disecondary diamines are used as chain lengthening agents; instead, organic dispersions of the corresponding polyurethanes or polyurethane ureas which are stable are obtained. The dispersions are in some cases only stable at high temperatures. Such dispersions can easily be worked up into microporous sheets although this is not possible from homogeneous solutions of the same polyurethanes.

In particular, a process has thus been found for the production of microporous sheets by the direct or reverse process by chain lengthening of higher molecular weight polyisocyanates and if desired low molecular weight polyisocyanates with disecondary diamines using an NCO/NH ratio of 0.8 to 1.2 in solution, in which the reactants are reacted in a solvent or solvent mixture which is not able to dissolve the resulting polyaddition product but only able to cause swelling, or in a solvent mixture in which at least one component is a nonsolvent for the polyaddition product being formed and has an evaporation number at least 1.5 times greater (according to DIN 53170) than the other components, to form stable organic dispersions, the dispersions being in some cases stable only at elevated temperatures, and the dispersions are poured out on to supports, if necessary after they have been mixed with nonsolvents, and the solvents are then removed.

Higher molecular weight polyisocyanates (prepolymers) which are suitable for use in the process according to the invention are particularly those compounds which have a molecular weight of between 1000 and 5000. They are prepared by reacting higher molecular weight compounds which contain at least two terminal OH groups with excess diisocyanates, e.g. according to DBP 929,507, DBP 897,014 or DBP 831,772. The prepolymers must be prepared carefully in order to insure their bifunctionality. Their NCO content should therefore be only slightly if at all below the calculated amount.

Suitable higher molecular weight OH compounds are, for example, unbranched polyesters, polyethers, polycarbonates, polyacetals, polythioethers and polysiloxanes, preferably with molecular weights of 800 to 4000 (see Saunders and Frisch, Polyurethane I "New York" (1962) pages 32–61 and the literature quoted there).

Any suitable hydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, hexanediol, hexanetriol, glycerine, bis-(hydroxy-methylcyclohexane), trimethylol propane, pentaerythritol and the like. The hydroxyl polyester should have a molecular weight of from about 500 to about 3000, an hydroxyl number of from about 30 to 300 and an acid number of less than about 5.

Any suitable polyester amide may be used such as, for example, the reaction product of an amine or an amino alcohol with a polycarboxylic acid. Any suitable amine such as, for example, ethylene diamine, propylene diamine and the like may be used. Any suitable aminoalcohol such as, for example, beta-hydroxy ethyl amine and the like may be used. Any of the polycarboxylic acids set forth above with relation to the preparation of hydroxy polyesters may be used in the preparation of polyester amides. The polyester amides may also be prepared by the reaction of dioldiamides such as, for example, the reaction product of adipic acid and diethanolamide, terephthalic acid-bis-propanolamide with a dicarboxylic acid. The polyester amides should have a molecular weight, hydroxyl number and acid number comparable to polyesters.

The polyesters and the polyester amides may be reacted with isocyanates to prepare hydroxyl or amine terminated compound containing urethane and urea linkages which are suitable for use in the preparation of the spinning solution of this invention. Any suitable isocyanate which will be set forth hereinafter may be used.

Any suitable polyether ester may be used as the organic compound containing active hydrogen atoms such as, for example, the reaction product of an ether glycol and a dicarboxylic acid such as those previously mentioned with relation to the preparation of polyesters. Any suitable ether glycol may be used such as, for example, diethylene glycol, triethylene glycol, 1,4-phenylene bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylolpropane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4(beta-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Polyethers, especially 1,2-propylene glycol polyethers, which have molecular weights between 1000 and 3000 are preferred.

Any suitable monomeric organic diisocyanate may be used in the preparation of the prepolymer or in addition to the prepolymer in the reaction mixture such as, for example,
ethylene diisocyanate,
ethylidene diisocyanate,
propylene diisocyanate,
butylene diisocyanate,
cyclopentylene-1,3-diisocyanate,
cyclohexylene-1,4-diisocyanate,
cyclohexylene-1,2-diisocyanate,
2,4-toluylene diisocyanate,
2,6-toluylene diisocyanate,
4,4'-diphenylmethane diisocyanate,
2,2'-diphenyl propane-4,4'-diisocyanate,
3,3'-dimethyl diphenylmethane-4,4'-diisocyanate,
p-phenylene diisocyanate,
m-phenylene diisocyanate,
dibenzyl-4,4'-diisocyanate,
xylylene diisocyanate,
1,4-naphthylene diisocyanate,
1,5-naphthylene diisocyanate,
diphenyl-4,4'-diisocyanate,
azobenzene-4,4'-diisocyanate,
diphenyl sulphone-4,4'-diisocyanate,
dichlorohexamethylene diisocyanate,
tetramethylene diisocyanate,
pentamethylene diisocyanate,
hexamethylene diisocyanate,
1-chlorobenzene-2,4-diisocyanate,
furfurylidene diisocyanate,
2,7-diisocyanate-dibenzofuran and the like. It is preferred, however, that the aromatic diisocyanates be used. Any suitable uretdione diisocyanate may be used such as, for example, the dimers of any of the above-mentioned diisocyanates.

Also, any of the isocyanates set forth in Annalen, volume 562, 1949, pages 75 to 136, may be used; 4,4'- diphenylmethane diisocyanate, 2,4-toluylene diisocyanate, 2,6-toluylene diisocyanate, isomeric mixtures of 2,4- and 2,6-toluylene diisocyanate and 1,5-naphthylene diisocyanate are preferred.

The chain lengthening agents used are aliphatic or aliphatic-aromatic disecondary diamines, e.g. of the formula:

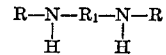

in which R denotes an alkyl radical (preferably $C_1$–$C_6$) and $R_1$ denotes an alkylene radical (preferably $C_1$–$C_8$) or arylene radical (preferably diphenylmethane) such as, for example,
N,N'-dimethylethylene diamine,
N,N'-dimethylhexamethylene diamine-1,6,
N,N'-dibutylcyclohexylene diamine,
N,N'-dihexylphenylene diamine,
4,4'-bis-(N-methylamine)diphenylmethane,
N,N'-diamyloctamethylene diamine-1,8,
N,N'-dipropylxylylene diamine,
N,N'-diethylpropylene diamine,
4,4'-bis-(N-butylamine)-diphenylmethane and the like.

In the homogeneous form, the polyaddition products should have a Shore hardness A above 60, a tensile strength above 100 kg./cm.$^2$ and a softening range (determined e.g. on a Kofler block) above 100° C.

Whether the polyaddition products meet these requirements can be determined by carrying out the reaction in known manner in a highly polar solvent, casting the resulting elastomer solution to form homogeneous films, and determining the physical data on these films.

The solubilizing powder of different solvents can also be determined on these films.

In accordance with the process according to the invention, the solvents or solvent mixtures used should not be able to dissolve the polyaddition product but only to cause it to swell. For such a solvent or solvent mixture to be suitable, a homogeneous sample of film 0.2 to 0.5 mm. in thickness placed in the solvent or solvent mixture for 29 hours at 20° C. must absorb more than 100 percent by weight by swelling without dissolving to form a clear solution.

If it is desired to use solvents in which the film sample clearly dissolves or in which the polyaddition leads to a clear solution, the solubilizing power must be diminished by blending the solvent with nonsolvents and/or solvents which only cause swelling of the film. Nonsolvents are compounds in which a homogeneous sample of the film takes up less than 50 percent by weight by swelling under the conditions defined above.

It is advantageous to use in the mixture only nonsolvents the evaporation number of which is at least 1.5 times greater than that of the swelling agent or solvent so that when the dispersions are subsequently worked up to form microporous sheets, the nonsolvents will mainly evaporate after the said swelling agents or solvents on drying. The evaporation number is determined according to DIN 53170.

The following are mentioned as examples of solvents which cause solution or swelling: Esters such as ethyl acetate, propyl acetate, butyl acetate, methoxyethyl acetate, methyl propionate, ethyl propionate, dimethylcarbonate, diethylcarbonate and dimethyloxalate, ketones such as acetone, methyl ethyl ketone and cyclohexanone, ethers such as di-n-propyl ether, dibutyl ether, anisole, phenetole, tetrahydrofuran and dioxane, chlorinated aliphatic and aromatic hydrocarbons such as dichloromethane, ethylene chloride, trichloroethylene 1,2- and 1,3-dichloropropane, isobutyl chloride, chloroform, chlorocyclihexane, chlorobenzene and chlorotoluene, and tertiary alcohols such as tertiary-butanol.

The following are mentioned as examples of nonsolvents: Aliphatic hydrocarbons such as pentanes, hexanes, heptanes, and octanes, cycloalkanes or alkylated cycloalkanes, such as cyclohexane or methyl cyclohexane, petroleum fractions such as ligroin, cleaning petrol, mineral spirits, mepasine and turpentine oils, aromatic hydrocarbons such as benzene, toluene, xylene, ethylbenzene and tetraline, or perchlorinated hydrocarbons such as carbon tetrachloride, perchloroethylene and hexachloroethane.

It is preferable to use solvents which boil below 200° C. If higher-boiling solvents are used, they are advantageously recovered from the porous sheets by expression, centrifuging or extraction. The process is carried out as follows: The prepolymers which contain NCO groups are dissolved in the chosen solvent or solvent mixture in concentrations of 5 to 25 percent, and the disecondary diamines, if desired in solution, are generally added at or below room temperature. If low molecular weight diisocyanates are also included, these may be mixed with the prepolymer or added when the prepolymer has undergone substantial reaction with the excess amine. The NCO/NH ratio may be varied from 0.8 to 1.2 and is preferably between 1.0 and 1.1. The reaction solutions are now stirred for 1 to 3 hours below 25° C. and then heated for 1 to 3 hours at 50 to 150° C. or under reflux until polyaddition is terminated. The progress of the polyaddition reaction can be followed by determination of the NCO content. Cloudiness occurs shortly after the reaction begins, and continuously increases. Finally, if swelling solvents or mixtures of swelling and dissolving solvents are used, organic dispersions of the completely reacted polyurethanes or polyurethanes ureas which are stable even in the cold are obtained. Such dispersions can be worked up into microporous sheets by adding nonsolvents which have an evaporation number greater by at least the factor 1.5, pouring the mixture out on to substrates and evaporating the solvents.

When, however, nonsolvents are included in the mixture, organic disperions which coagulate in the cold but are redispersible on heating are obtained. More nonsolvent can then be added, and the dispersions may then be poured on to substrates while hot. Gelling takes place on cooling, and porous foils remain behind after evaporation of the solvents.

If an amount of nonsolvent is included in the mixture such that the polyaddition will only just proceed without phase separation, organic dispersions which, when poured out hot, gel on cooling and can be dried to form porous foils without any further additives are obtained.

It has been found that porous structures are more readily formed from dispersions of the type described than from homogeneous polyurethane solutions.

Another advantage is that higher concentrations can be obtained by the disperse distribution of the polyaddition product in the solvent than in comparable homogeneous solutions.

The dispersions prepared by the process which dry to form porous foils without further additives yield heterodisperse elastomeric films which are distinguished by being warm to the touch. These can be used e.g. for textile coatings.

The chain lengthening reaction with disecondary diamines generally does not require the use of catalysts, although the conventional catalysts (see J. H. Saunders and K. G. Frisch "Polyurethanes" I, New York (1962) page 212) may be used to effect complete reaction of any excess NCO groups present with cross-linking.

The microporous polyurethane (urea) foils may be subjected to additional cross-linking. The cross-linking agents may either be added directly to the dispersions before casting or to the finished film. Cross-linking agents are, for example, formaldehyde or compounds which split off formaldehyde, peroxides and polyisocyanates.

If the microporous sheets produced by the process have been formed on nonporous supports, they may be glued by discontinuous layers of adhesive to woven or knitted fabrics, fleeces, felts, split leather, etc. The sheets which have been produced directly on a porous support and those which have been glued onto a porous support can be finished and worked up by the usual processes for synthetic leather.

The invention is further illustrated but not limited by the following examples in which parts are by weight unless otherwise specified.

EXAMPLE 1

About 100 parts (0.5 mol) of 1,2-propylene glycolpolyether of average molecular weight 2000 (OH number 56) are heated together with about 500 parts (2 mols) of 4,4'-diphenylmethane diisocyanate for about 5 hours at about 80° C. The NCO content is then 8.34 percent (calculated 8.4 percent).

About 300 parts of the prepolymer are dissolved in about 1,260 parts of ethyl acetate. About 64.2 parts of 4,4'-bis-(N-methylamino)-diphenylmethane in about 200 parts of ethyl acetate are added, and the reaction mixture is heated under reflux for about 3 hours. A low viscosity dispersion of polyurethane (urea) is obtained.

About 100 parts of the dispersion are mixed by stirring with about 113 parts by volume of cleaning petrol, about 1.9 parts of the reaction product of 1 mol of 1,1,1-trihydroxymethylpropane and 3 mols of 2/4-toluylene diisocyanate, about 0.03 part of dimethylbenzylamine and about 0.16 part of a yellow dye which is soluble in organic solvents, and the mixture is poured on to a glass plate of area 1000 cm.$^2$. After evaporation of the solvent, a microporous film having a permeability to water vapor of 9.2 mg./cm.$^2$/hour is obtained.

EXAMPLE 2

About 200 parts of the preadduct from Example 1 are dissolved in about 800 parts of 1,2-dichloropropane and about 400 parts by volume of mineral spirits. About 42.6 parts of 4,4'-bis-(N-methylamino)-diphenylmethane in about 200 parts of 1,2-dichloropropane are added, and the reaction mixture is heated with stirring for about 3 hours at about 100° C. A 15.7 percent dispersion which is stable on storage is obtained. This dispersion dries to form heterodisperse but nonporous foils.

About 200 parts of the dispersion are mixed by stirring with about 40 parts by volume of mineral spirits, whereupon the mixture coagulates. After heating to about 40°

C., the mixture is redispersed; on the addition of a further 50 parts by volume of mineral spirits, coagulation again occurs. After heating to about 100° C., the dispersion again forms. This dispersion is now poured on to a stamped steel plate of area 2000 cm.² while hot and the solvent is allowed to evaporate at room temperature. A microporous sheet having a permeability to water vapor of 5.4 mg./cm.²/hour and which can withstand being bent 200,000 times in the Bally flexometer without damage is obtained.

EXAMPLE 3

13.8 percent organic polyurethane (urea) dispersion which coagulates when cooled to about 20° C. is prepared according to Example 2 from about 200 parts prepolymer, about 46.2 parts of 4,4'-bis-(N-methyl-amino)-diphenylmethane, about 1000 parts of 1,2-dichloropropane and about 700 parts by volume of mineral spirits.

The mixture is redispersed by heating, about 180 parts by volume of mineral spirits are added at about 110° C., and the dispersion is poured while still hot on to a glass plate of area 1 m.² and dried at 70° C. (temperature of drying cupboard). A microporous film having a permeability to water vapor of 2.3 mg./cm.²/hour is obtained.

EXAMPLE 4

A polyurethane (urea) dispersion is obtained by heating about 100 parts of preadduct from Example 1 and about 21.8 parts of 4,4'-bis-(N-methylamino)-diphenylmethane in about 500 parts of 1,2-dichloropropane and about 500 parts by volume of mineral spirits at about 100° C. for about 3 hours, and the dispersion is poured while still hot on a glass plate of area 5000 cm.² After evaporation of the solvent, a microporous sheet remains having a permeability to water vapor of 10.8 mg./cm.²/hour.

A dispersion prepared analogously in about 490 parts of ethyl acetate and about 640 parts by volume of cleaning petrol yields a sheet having a permeability to water vapor of 5.2 mg./cm.²/hour.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for the production of microporous sheets which consists essentially of reacting (1) an NCO terminated prepolymer having a molecular weight of from about 1000 to about 5000 and prepared by reacting a (a) difunctional compound having a molecular weight of from about 800 to about 4000 and containing hydroxyl groups that are reactive with NCO groups and (b) an excess of an organic diisocyanate with (2) a disecondary diamine having the formula.

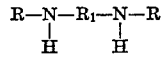

wherein R is an alkyl radical and $R_1$ is an alkylene or arylene radical in an amount such that the NCO to NH ratio is from about 0.8 to about 1.2 in (3) an inert liquid that is a solvent for the reactants but only causes the product thereof to swell to the extent that a homogeneous film prepared from the said reactants 0.2 to 0.5 mm. thick when placed in the inert substance for 29 hours at 20° C. absorbs more than 100 percent by weight by swelling without dissolving to form a storage-stable dispersion and forming microporous sheets by spreading the dispersion on a substrate and evaporating the liquid.

2. The process of claim 1 wherein the NCO terminated prepolymer (1) is obtained from a 1,2-propylene glycol polyether and 4,4'-diphenylmethane diisocyanate.

3. The process of claim 1 wherein the NCO terminated prepolymer (1) is obtained from a 1,2-propylene glycol polyether and a tolylene diisocyanate.

4. The process of claim 1 wherein the disecondary diamine is 4,4'-bis-(N-methylamino)-diphenylmethane.

5. The process of claim 1 wherein the reaction product of the NCO terminated prepolymer and the disecondary diamine in the inert substance is a dispersion, the extinction of which in the visible range amounts to 100 percent measured against the solvent in a Zeiss Elko III colorimeter with fiilter J 66.2.

6. The process of claim 1 wherein the inert substance (3) is a mixture of a solvent and a nonsolvent for the product, the nonsolvent having an evaporation number at least 1.5 times greater according to DIN 53170 than the other components.

References Cited
UNITED STATES PATENTS

| | | | |
|---|---|---|---|
| 3,190,766 | 6/1965 | Yuan | 260—2.5 AY |
| 3,483,015 | 12/1969 | Fukushima | 260—2.5 AY |
| 3,484,273 | 12/1969 | Kawase | 260—2.5 AY |
| 3,100,721 | 8/1963 | Holden | 264—41 X |
| 3,625,871 | 12/1971 | Traubel | 260—41 X |
| 3,644,233 | 2/1972 | Traubel | 260—2.5 AY |
| 3,348,963 | 10/1967 | Fukushima | 264—41 X |
| 3,403,046 | 9/1968 | Schwacke | 264—41 X |
| 3,190,765 | 6/1965 | Yuan | 264—41 X |
| 3,000,757 | 9/1961 | Johnston | 264—41 X |
| 3,388,100 | 6/1968 | Thoma | 264—41 X |

DONALD E. CZAJA, Primary Examiner

G. R. MARSHALL, Assistant Examiner

U.S. Cl. X.R.

117—161 KP, 260—2.5 AV

UNITED STATES PATENT OFFICE
CERTIFICATE OF CORRECTION

Patent No. 3,769,381      Dated October 30, 1973

Inventor(s) Klaus Konig, Harro Traubel and Artur Reischl and Bruno Zorn

It is certified that error appears in the above-identified patent and that said Letters Patent are hereby corrected as shown below:

Column 1, line 11, the number of the German Convention application should be corrected to read -- F 53 886 IVc/39b --.

Column 2, line 5, "colorimiter" should be corrected to --colorimeter--

Column 4, line 65 "powder" should be corrected to --power--

Column 5, line 60, "polyurethanes ureas" should be corrected to --polyurethane ureas--

Signed and sealed this 8th day of October 1974.

(SEAL)
Attest:

McCOY M. GIBSON JR.
Attesting Officer

C. MARSHALL DANN
Commissioner of Patents